United States Patent

Breitwieser

[11] Patent Number: 6,117,922
[45] Date of Patent: Sep. 12, 2000

[54] SOLID, STORAGE-STABLE ANTISTAT MIXTURES AND PROCESS FOR THEIR PREPARATION

[75] Inventor: Michael Breitwieser, Augsburg, Germany

[73] Assignee: Clariant GmbH, Frankfurt, Germany

[21] Appl. No.: 09/039,596

[22] Filed: Mar. 16, 1998

[30] Foreign Application Priority Data

Mar. 21, 1997 [DE] Germany .................. 197 11 814

[51] Int. Cl.⁷ ............... B01F 17/22; B01F 17/34; B29B 9/00; C08J 3/22
[52] U.S. Cl. ................ 523/351; 260/DIG. 15; 260/DIG. 20; 264/5; 516/203; 516/915; 524/911; 524/913
[58] Field of Search .............. 516/203, 915; 260/DIG. 15, DIG. 21; 523/357; 524/911, 913; 264/5

[56] References Cited

U.S. PATENT DOCUMENTS

| | | | |
|---|---|---|---|
| 3,625,915 | 12/1971 | Gubler et al. | 260/DIG. 15 |
| 4,147,742 | 4/1979 | Castro et al. | 260/DIG. 21 |
| 4,268,583 | 5/1981 | Hendy | 524/911 X |
| 4,591,452 | 5/1986 | Worschech et al. | 523/351 X |
| 5,098,939 | 3/1992 | Sienkowski et al. | 524/913 X |

FOREIGN PATENT DOCUMENTS

| | | |
|---|---|---|
| 0215444 | 3/1987 | European Pat. Off. . |
| 0259960 | 3/1988 | European Pat. Off. . |
| 0 492 463 A2 | 7/1992 | European Pat. Off. . |
| 0492463 | 7/1992 | European Pat. Off. . |
| 57-031942 | 2/1982 | Japan ................ 524/913 |
| 58-059245 | 4/1983 | Japan . |
| 58-079042 | 5/1983 | Japan . |
| 61-028537 | 2/1986 | Japan ................ 524/913 |
| 63-056545 | 3/1988 | Japan . |
| 01141932 | 6/1989 | Japan . |
| 04103667 | 4/1992 | Japan . |
| 05017696 | 1/1993 | Japan . |
| 05239445 | 9/1993 | Japan . |

OTHER PUBLICATIONS

European Search Report, Jul. 1998.
Derwent Abstract—XP–002071212, Jan. 1975.

*Primary Examiner*—Richard D. Lovering
*Attorney, Agent, or Firm*—Susan S. Jackson; Scott E. Hanf

[57] ABSTRACT

The present invention relates to an antistatic mixture comprising compounds of the formulae (I) and (II)

$$R^1-N-[(C_nH_{2n})-OH]_2 \qquad (I)$$

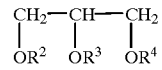

(II)

where
n is 2 or 3
$R^1$ is $C_8$–$C_{22}$-alkyl or -alkenyl or $C_8$–$C_{22}$-alkyl-CO— and
$R^2$, $R^3$ and $R^4$ may be identical or different and are $C_8$–$C_{22}$-alkyl or -alkenyl and two of these radicals may be hydrogen,
and where the mixing ratio of the compounds of formulae I and II is from 4:1 to 1:10 parts by weight, and to a process for preparing this mixture.

This mixture is solid and is therefore easy to use in production, and is storage-stable and offers advantages in handling.

12 Claims, No Drawings

SOLID, STORAGE-STABLE ANTISTAT MIXTURES AND PROCESS FOR THEIR PREPARATION

The invention relates to solid, storage-stable antistat mixtures which have advantages in the handling of such antistats and show mutual synergistic reinforcement in their antistatic action, and to a process for their preparation.

Plastics have gained an important position as insulating materials in the electrical and electronics sectors because of their high volume resistance and surface resistivity. However, the same structure-related properties cause severe electrostatic charging of the surface during any procedure for separation from other media; this is undesirable for various reasons and attempts are therefore made to reduce, by the use of suitable additives, the ability of the plastics to become charged.

Fatty acid glycerides, essentially glycerol monostearate (GMS) but also glycerides based on other fatty acids, have long been used as antistats to prevent the electrostatic charging of thermoplastics. These monoglycerides may be in pure form, but they may also comprise varying proportions of di- and triglycerides. GMS is occasionally used as sole antistat in formulations for thermoplastic molding compositions (cf. e.g. JP 04103667 and JP 58059245) but is much more frequently used in a mixture with other antistats, with alkanesulfonic acids and their salts (JP 05017696) or with certain secondary amines (JP 57031942). JP 01141932 describes the advantages of a ternary combination of fatty acid glycerides with fatty acid amine ethoxylates and fatty alcohols. In many cases, GMS or other fatty acid glycerides are used together with alkylamine ethoxylates and alkylamide ethoxylates (JP 05239445, EP-A-492463, JP 63056545).

The use of GMS in polypropylene is particularly widespread, since it is known that GMS has a favorable effect on the tendency of PP to discolor during processing (JP 58079042). GMS as antistat is also distinguished by becoming active very rapidly. However, a disadvantage of GMS is that the antistatic action has a limited life. The antistatic action is generally observed to fall away 2–3 weeks after molding, and after about 5 weeks approaches the level in a molding composition without the additive.

Ethoxylated fatty amines are also antistats whose use is very widespread, and are used in particular for giving long-lasting antistatic properties to polyolefins. The fatty amines used, however, are mostly liquids, for example ethoxylated coconut fatty alkylamine (2,2'-bishydroxyethyl-$C_{12}$–$C_{14}$-alkylamine), and less frequently solids, and are frequently waxy. Ethoxylated tallow fatty alkylamine (2,2'-bishydroxyethyl-$C_{16}$–$C_{18}$-alkylamine) has a waxy consistency. The ethoxylated coconut fatty alkylamine, because of its lower molecular weight, has a higher diffusion rate in the plastic matrix and therefore reaches the surface of the molding composition more rapidly than the ethoxylated tallow fatty amine, and also therefore generally becomes active more rapidly.

Many plastics processors cannot use additives of this type, which are liquid or semisolid. The processor therefore provides the antistatic properties by using a masterbatch, which comprises the ethoxylated amine incorporated into a polymer in pellet form. The preparation of masterbatches of this type with liquid additives is complicated, since the liquid must be pumped into the melt via an apparatus for metering liquids. It is also known that only up to a certain proportion of these additives can be incorporated into masterbatches. The limit for ethoxylated amine in conventional masterbatches is 10% in practice. Even at an addition rate of 5% in the masterbatch, the additive migrates out as time passes and thus makes handling and storage more difficult and restricts shelf-life. The general trend toward preparing concentrates of active ingredients and masterbatches containing high concentrations of active ingredients is therefore subject to a relatively low upper limit in the case of liquid ethoxylated amines.

Although ethoxylated amines in solid form are marketed, for example in a mixture with calcium stearate, relatively large amounts of compounding auxiliaries of this type have to be used if free-flowing properties are to be maintained at an adequate level.

It was therefore an object to develop solid formulations for the alkoxylated amines, which formulations are pulverulent and retain their form during storage, transport and handling, and have a high proportion of these alkoxylated amines.

Surprisingly, it has been found that mixing of alkoxylated amines with liquid or waxy fatty acid glycerides gives solid, and therefore easily compoundable, and storage-stable antistats for plastics.

The form mentioned, which is advantageous for compounding, is obtained by separate premixing of only these constituents mentioned above, if desired combined with further process steps, in contrast to the conventional process of mixing together a number of additives, or even all of the additives, which are subsequently to be incorporated into the polymer.

The invention thus provides solid, storage-stable antistat mixtures comprising alkoxylated amines of the formula (I) and fatty acid glycerides of the formula (II)

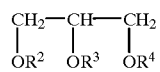

where n is 2 or 3, preferably 2, $R^1$ is $C_8$–$C_{22}$-alkyl or -alkenyl, preferably $C_{12}$–$C_{18}$-alkyl or -alkenyl, or $C_8$–$C_{22}$-, preferably $C_{12}$–$C_{18}$-alkyl-CO—, and $R^2$, $R^3$ and $R^4$ may be identical or different and are $C_8$–$C_{22}$ -alkyl or -alkenyl, preferably $C_{12}$–$C_{18}$-alkyl or -alkenyl and two of these radicals may be hydrogen, and where the mixing ratio of the compounds of the formulae I and II is from 4:1 to 1:10 parts by weight, preferably from 1:2 to 1:6 parts by weight and in particular from 1:3.5 to 1:4.5 parts by weight.

The novel mixtures are solid at room temperature and are therefore easy to handle, and, for example as powders or pellets which are storage-stable and do not cake, offer considerable technical advantages to the plastics processor, since, inter alia, the disadvantages described for the use of masterbatches are absent. There is no necessity for further additives which have no antistatic activity. The novel mixture moreover has a synergistic antistatic action when compared with the individual components.

Preferred compounds of the formula II are those in which only one alkyl or alkenyl radical is present, i.e. either $R^2$, $R^3$ or $R^4$ is alkyl or alkenyl in accordance with the definition given above and the remaining two symbols represent hydrogen.

The novel mixtures may in addition contain yet other additives, such as silicic acid, Cu stearate, Zn stearate, PE and PE wax and PP and PP wax.

The invention further provides a process for preparing solid, storage-stable antistat mixtures, which comprises mixing alkoxylated amines of the formula (I) and fatty acid glycerides of the formula (II)

  (I)

  (II)

where n is 2 or 3, preferably 2, $R^1$ is $C_8$–$C_{22}$-alkyl or -alkenyl, preferably $C_{12}$–$C_{18}$-alkyl or -alkenyl, or $C_8$–$C_{22}$-, preferably $C_{12}$–$C_{18}$-alkyl-CO— and $R^2$, $R^3$ and $R^4$ may be identical or different and are hydrogen, $C_8$–$C_{22}$ -alkyl or -alkenyl, preferably $C_{12}$–$C_{18}$-alkyl or -alkenyl, in a ratio of from 4:1 to 1:10 parts by weight, preferably from 1:2 to 1:6 parts by weight and in particular from 1:3.5 to 1:4.5 parts by weight and, if necessary, subjecting them to further process steps.

The novel process generally includes the reaction steps of mixing the two components and of heating until a homogeneous melt is obtained, this taking place generally at below 200° C., preferably at 150° C., particularly at about 90° C. In a further process step, this melt may, for example, be further processed via a melt spray apparatus to give a sprayed powder, or, after cooling and/or solidifying in bulk, be comminuted, for example through a pelletizer.

Other production methods are also possible, for example using an extruder (with die-head cutting), an edge-runner mixer with perforated plate, a flaking roll or a drop belt, etc. In individual cases, for example in the case of a mixture of the N-bis-hydroxyethyl derivative of tallow fatty amine and a grade of GMS which contains 55% of monostearate, even the mere physical mixing of both components is adequate.

The antistat mixtures prepared by the novel process may be incorporated into the plastic molding compositions by the usual methods, for example by mixing the mixture obtained according to the invention and, if desired, further additives, into the melt before or during molding. It is also possible for the mixture in dissolved or dispersed form to be applied directly to the polymer or added to a solution, suspension or emulsion of the polymer. The amount of the mixture to be added to the polymer is from 0.01 to 6% by weight, preferably from 0.06 to 4% by weight, in particular from 0.1 to 3% by weight, based on the material whose properties are to be improved. The mixture may also be added to the polymer whose properties are to be improved in the form of a masterbatch or additive concentrate which contains from 2.5 to 70% by weight of the mixture.

The plastic molding composition may, in addition, contain the usual additives, such as antioxidants, plasticizers, impact-modifiers, processing aids and stabilizers, agents to counteract the action of light, lubricants, fillers, flame retardants, blowing agents, pigments, dyes or colorants, and also other antistats. In this connection, reference is expressly made to EP-A-0 742 254, page 3, line 31—page 8, line 17.

The following review lists a few of the organic thermoplastic or duroplastic polymers which may make up the plastic molding compositions which can be provided with the mixtures prepared according to the invention:

1. Polymers of mono- and diolefins, for example high-, medium- or low-density polyethylene (which may, if desired, be crosslinked), polypropylene, polyisobutylene, poly-1-butene, polymethyl-1-pentene, polyisoprene or polybutadiene or cycloolefin polymers, such as those of cyclopentene or norbornene.

2. Mixtures of the polymers mentioned under 1), such as mixtures of polypropylene with polyethylene or with polyisobutylene.

3. Copolymers of mono- and diolefins with one another or with other vinyl monomers, for example ethylene-propylene copolymers, propylene-1-butene copolymers, propylene-isobutylene copolymers, ethylene-1-butene copolymers, propylene-butadiene copolymers, isobutylene-isoprene copolymers, ethylene-alkyl acrylate copolymers, ethylene-alkyl methacrylate copolymers, ethylene-vinyl acetate copolymers or ethylene-acrylic acid copolymers and salts of these (ionomers), and also terpolymers of ethylene with propylene and a diene, such as hexadiene, dicyclopentadiene or ethylidenenorbornene.

4. Polystyrene, poly(p-methylstyrene).

5. Copolymers of styrene or α-methylstyrene with dienes or acrylic derivatives, for example styrene-butadiene, styrene-maleic anhydride, styrene-acrylonitrile, styrene-ethyl methacrylate, styrene-butadiene-ethyl acrylate, styrene-acrylonitrile-methacrylate; mixtures of high impact strength made from styrene copolymers and another polymer, such as a polyacrylate, a diene polymer or an ethylene-propylene-diene terpolymer; and also block copolymers of styrene, such as styrene-butadiene-styrene, styrene-isoprene-styrene, styrene-ethylene/butylene-styrene or styrene-ethylene/propylene-styrene.

6. Graft copolymers of styrene, such as styrene on polybutadiene, styrene and acrylonitrile on polybutadiene, styrene and maleic anhydride on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and also mixtures of these with the copolymers mentioned under 5), which are known, for example, as ABS, MBS, ASA or AES polymers.

7. Polyvinyl chloride.

8. Copolymers of vinyl chloride, which may be prepared by the known processes (such as suspension, bulk or emulsion polymerization).

9. Copolymers of vinyl chloride with up to 30% by weight of comonomers, such as vinyl acetate, vinylidene chloride, vinyl ethers, acrylonitrile, acrylates, mono- or diesters of maleic acid or olefins or also graft polymers of vinyl chloride.

10. Halogen-containing polymers, such as polychloroprene, chlorinated rubber, chlorinated or chlorosulfonated polyethylene, epichlorohydrin homo- and copolymers, in particular polymers made from halogenated vinyl compounds, for example polyvinylidene chloride, polyvinyl fluoride, polyvinylidene fluoride; or also copolymers of these, such as of vinyl chloride and vinylidene chloride, vinyl chloride and vinyl acetate or vinylidene chloride and vinyl acetate.

11. Polymers derived from α-,β-unsaturated acids and their derivatives, for example polyacrylates and polymethacrylates, polyacrylamides and polyacrylonitriles.

12. Copolymers of the monomers mentioned under 11) with one another or with other unsaturated monomers, for example acrylonitrile-butadiene copolymers, acrylonitrile-alkyl acrylate copolymers, acrylonitrile-alkoxyacrylate copolymers, acrylonitrile-vinyl halide copolymers or acrylonitrile-alkyl methacrylate-butadiene copolymers.

13. Polymers derived from unsaturated alcohols and amines and/or from acyl derivatives or acetals of these, for example polyvinyl alcohol, polyvinyl acetate, stearate, benzoate or maleate, or polyvinyl butyral, polyallyl phthalate or polyallyl-melamine.

14. Homo- and copolymers of cyclic ethers, for example polyethylene glycols, polyethylene oxide, polypropylene oxide or copolymers of these with bisglycidyl ethers.

15. Polyacetals, such as polyoxymethylene and also those polyoxymethylenes which contain comonomers, such as ethylene oxide.

16. Polyphenylene oxides and sulfides and mixtures of these with styrene polymers.

17. Polyurethanes derived on the one hand from polyethers, polyesters and polybutadienes having terminal hydroxyl groups and, on the other hand, aliphatic or aromatic polyisocyanates, and also precursors of these polyurethanes (prepolymers of polyisocyanates and polyols).

18. Polyamides and copolyamides derived from diamines and dicarboxylic acids and/or from aminocarboxylic acids or from the corresponding lactams, for example nylon 4, nylon 6, nylon 6,6, nylon 6,10, nylon 11, nylon 12, poly-2,4,4-trimethylhexa-methylene terephthalamide, poly-m-phenylene isophthalamide, and also copolymers of these with polyethers, for example with polyethylene glycol, polypropylene glycol or polytetramethylene glycol.

19. Polyureas, polyimides and polyamideimides.

20. Polyesters derived from dicarboxylic acids and diols and/or from hydroxy-carboxylic acids or from the corresponding lactones, for example polyethylene terephthalate, polybutylene terephthalate, poly-1,4-dimethylolcyclohexane terephthalate, poly(2,2-bis(4-hydroxyphenyl)propane) terephthalate, polyhydroxybenzoates, and also block polyetheresters derived from polyethylene having hydroxyl end groups, dialcohols and dicarboxylic acids.

21. Polycarbonates and polyestercarbonates.

22. Polysulfones, polyethersulfones and polyetherketones.

23. Crosslinked polymers derived from, on the one hand, aldehydes and, on the other hand, phenols, urea or melamine, for example phenol-formaldehyde resins, urea-formaldehyde resins and melamine-formaldehyde resins.

24. Drying and non-drying alkyd resins.

25. Unsaturated polyester resins derived from copolyesters of saturated and unsaturated dicarboxylic acids with polyhydric alcohols, and also from vinyl compounds as crosslinking agents, and also halogen-containing, flame-retardant modifications of these.

26. Crosslinkable acrylic resins derived from substituted acrylates, for example epoxyacrylates, urethane acrylates or polyester acrylates.

27. Alkyd resins, polyester resins and acrylate resins which are crosslinked with melamine resins, urea resins, polyisocyanates or epoxy resins.

28. Crosslinkable epoxy resins derived from polyepoxides, for example from bisglycidyl ethers or from cycloaliphatic diepoxides.

29. Naturally occurring polymers, such as cellulose, natural rubber, gelatins and also the chemically converted polymer homolog derivatives of these, such as cellulose acetate, propionate and butyrate, or cellulose ethers, such as methyl cellulose.

30. Mixtures of the polymers mentioned above, such as PP/EPDM, nylon 6/EPDM or ABS, PVC/EVA, PVC/ABS, PVC/MBS, PC/ABS, PBTP/ABS, PC/ASA, PC/PBT, PVC/CPE, PVD/acrylate, POM/thermoplastic PU, POM/acrylate, POM/MBS, PPE/HIPS, PPE/nylon 6,6 and copolymers, PA/HDPE, PA/PP or PA/PPE.

31. Naturally occurring and synthetic organic materials which are pure monomers or mixtures of monomers such as mineral oils, animal and vegetable fats, oils and waxes, or oils, fats and waxes based on synthetic esters, or mixtures of these materials.

32. Aqueous dispersions of natural or synthentic rubber.

Preferred polymers are polyolefins, such as polyethylene of various densities, such as LDPE, MDPE, HDPE or LLDPE, and polypropylene, and also polystyrene and polyvinyl chloride. The polyolefins are particularly preferred.

EXAMPLES

Production of Test Specimens

PP powder (MFI 230/5~3 g/10 min) was mixed in a mixer (Papenmeier type TLHK3) for 3 minutes at ambient temperature with the amounts given in the tables of the substances for testing. The mixture was pelletized by means of a (Leistriz) twins-crew extruder. The extrudate was cooled through a water bath before being pelletized. From the resultant pellets, sheets were injection-molded using a Windsor SP 50 injection-molding machine (Zone temperatures: 1/200° C., 2/210° C., 3/210° C., 4/220° C.). The thickness of the sheets was 1 mm.

Testing of Antistatic Properties

Measurement of the surface resistance according to DIN IEC (VDE 0303 Part 30) is a suitable method for assessing the action of antistats. For this, the electrical resistance of the surface of the test specimen is measured with a specific electrode. Most organic polymers, such as polyolefins, intrinsically have surface resistances of $\geq 10^{15}$ Ω, corresponding to an RO value (=decadic logarithm of the surface resistance) of RO$\geq$15. Molding compositions or test specimens produced therefrom which have surface resistances of less than RO=11 ($10^{11}$ Ω) count as having good antistatic properties. Values around RO=9 are regarded as very good.

The surface resistance was measured using a Teraohm-meter from Knick, Berlin, by the current-voltage method. The voltage for the measurements was 100 Volt. The range of measurement is $10^6$–$10^{15}$ Ω. Each of the values given for surface resistance is a mean value from at least 6 individual measurements. The results were determined by averaging the logarithm of the surface resistance. Measured values lying above the upper measurement limit of $10^{15}$Ω were given the value '15' for reporting purposes. This implies that when the numbers given for the mean values approach '15', they lose physical precision.

The second, likewise very powerful method, is the measurement of discharge half-life. This method directly observes the charging-discharging effect at the surface, by measuring the time during which a charge applied to the surface of the test specimen falls away to one half of its initial value. Half-life periods of 5 seconds are good, and values of 1 second and below are very good.

There was a similar procedure for the values measured for half-life period. The half-life period was observed over a period of 60 seconds. In cases where the charge had not fallen to half of the initial charge within 60 seconds, the measuremeint results were given a weighting of '60' seconds in the reporting of results. In the averaged half-life periods given, therefore, values above about 40 seconds are imprecise. If the half-life period in all of the measurements was 60 seconds, i.e. the result was equal to or outside the measurement limit of 60 seconds, the results were then given the distinguishing mark '>60'. Measured values of less than 1 second have been given the value '1' in the reporting of results, and if all of the measured values were less than 1 second, the result was then given as '>1'. During the storage period stated, and for the measurements, the test specimens were held in a room under standard conditions of temperature and humidity (23° C. at 50% relative humidity).

The table below shows the antistatic action of, respectively, a glycerol monostearate, an ethoxylated tallow fatty amine and a mixture of these.

TABLE 1

|  | SR after 4 days | HLP after 4 days | SR after 7 days | HLP after 7 days | SR after 14 days | HLP after 14 days | SR after 28 days | HLP after 28 days |
|---|---|---|---|---|---|---|---|---|
| Without | 14.8 | 60.0 | 15.0 | 60.0 | 14.5 | 60.0 | 15.0 | 60.0 |
| 0.6 phr of GMS | 14.8 | 60.0 | 15.0 | 60.0 | 14.2 | 60.0 | 14.6 | 60.0 |
| 0.15 phr of ethox. tallow fatty amine | 15.0 | 60.0 | 14.0 | 60.0 | 15.0 | 60.0 | 15.0 | 60.0 |
| 0.6 phr of GMS and 0.15 phr of ethox. tallow fatty amine | 12.9 | 60.0 | 11.3 | 16.6 | 10.4 | 3.9 | 10.3 | 4.8 | phr: Parts per hundred resin
GMS: Glycerol monostearate having 40% of distearate and 5% of tristearate
ethox. tallow fatty amine: Mixture of 78% of the N-bishydroxyethyl derivative of tallow fatty amine and 22% of Ca stearate
SR: Surface resistance
HLP: half-life period The values given in this table show that the mixture of the two individual components is more active than the respective individual components on their own, so that the action may be described as synergistic.

Description of the advantages of the mixture in production, using the caking test:

GMS and ethoxylated amines were mixed in various ways and agglomerization behavior was checked by the caking test.

The caking test serves to define the agglomeration behavior of pulverulent or other comminuted materials. It is carried out by weighing 50 g of the material to be tested into a glass cylinder (internal radius*height =27*100 mm) standing on a Petri dish. A piece of card having the internal diameter of the glass cylinder (53 mm) is then laid on top and subjected to pressure, using a ram of weight 2.0 kg. The entire system is stored for 24 hours under predetermined conditions (temperature, humidity). After conditioning the specimen to the measurement temperature or to the conditions for testing, the glass cylinder is carefully drawn off upward and the sheet of card is removed, so that the specimen material is left standing on the Petri dish in the form of a solid cylindrical body. The Petri dish is placed on the crossbeam of a machine for testing flexural strength (ZWICK type Z 423) and moved upward until the tip of the pressure cone just touches the surface of the material under test. The specimen is moved toward the pressure cone at an advance rate of 17 [mm/min], and the resulting force is recorded. The maximum force measured (Fmax), which acts upon the pressure cone as it penetrates the material of the sample, serves as a measure for comparison of the tendencies of different materials to compact, i.e. to cake.

Table 2 shows the results of the caking test. The values in the table are the compressive force in [N] necessary to crush the compressed tablets made from the mixtures.

C1 is the mixture made from the N-bishydroxyethyl derivative of tallow fatty amine (55% by weight) with calcium stearate (45% by weight); the mixture had been prepared from calcium stearate and the material C2 (see below) by physical mixing of powders.

C2 is the mixture made from the N-bishydroxyethyl derivative of tallow fatty amine (78% by weight) and calcium stearate (22% by weight), in the form of a sprayed, pulverulent mixture of melts.

A1 is the mixture of the N-bishydroxyethyl derivative of tallow fatty amine (39% by weight) with glycerol monostearate (GMS) (50% by weight) and calcium stearate (11% by weight), prepared from material C2 and GMS by mixing of the powders.

A2 is the mixture of the N-bishydroxyethyl derivative of tallow fatty amine (26% by weight) with GMS (66.6% by weight) and calcium stearate (7.3% by weight), prepared from material C2 and GMS by mixing the powders.

A3 is the mixture of the N-bishydroxyethyl derivative of tallow fatty amine (15.6% by weight) with GMS (80% by weight) and calcium stearate (4.4% by weight), prepared from material C2 and GMS by mixing the powders.

A3' is the mixture of the N-bishydroxyethyl derivative of tallow fatty amine (15.6% by weight) with GMS (80% by weight) and calcium stearate (4.4% by weight), prepared by using a pelletizer to pelletize a mixture of the melts of material C2 and GMS.

A3" is the mixture of the N-bishydroxyethyl derivative of tallow fatty amine (15.6% by weight) with GMS (80% by weight) and calcium stearate (4.4% by weight), prepared by atomizing a mixture of the melts of material C2 and GMS.

A3 a is the mixture made from the N-bishydroxyethyl derivative of tallow fatty amine (20% by weight) with GMS (80% by weight), prepared by atomizing a mixture of the melts of material S2 and GMS.

A4 is the mixture of the N-bishydroxyethyl derivative of tallow fatty amine (20% by weight) with GMS (80% by weight), prepared by using a pelletizer to pelletize a mixture of the melts of the N-bishydroxyethyl derivative of tallow fatty amine and GMS.

A4' is the mixture made from the N-bishydroxyethyl derivative of coconut fatty amine (20% by weight) with GMS (80% by weight), prepared by atomizing a mixture of the melts of ethoxylated coconut fatty amine and GMS.

S1 is GMS
S2 is the N-bishydroxyethyl derivative of coconut fatty amine

TABLE 2

Caking test with mixtures
The values in the table are the compressive force in [N] necessary to crush the compressed tablets made from the mixtures.

|  | Test Temperatures [° C.] | | | | | Drop point |
|---|---|---|---|---|---|---|
|  | 30 | 35 | 40 | 45 | 50 | [° C.] |
| S1 | — | 1.0 | 5.8 | — | — | about 58 |
| S2 | — | 170 | 275 | —[2)] | —[2)] | about 45 |
| C1 | — | — | 7.9 | 33.4 | 65.0 | about 97 |
| C2 | >100[1)] | >100 | — | — | — | about 90 |
| A1 | 34.3 | — | 79.0 | — | — | — |
| A2 | 22.6 | — | 32.9 | — | — | — |
| A3 | 6.4 | — | 9.32 | — | — | — |
| A3' | — | — | 8.3 | 11.8 | 61.3 | about 62 |
| A3" | — | 4.5 | — | 39.0 | — | about 58* |
| A3a | — | 46.0 | 71.0 | 130.0 | 132.0 | about 54* |
| A4 | — | — | 9.3 | 30.4 | >100 | about 52 |

— not tested
*hardening point
[1)] at 33° C.
[2)] melted

As can be seen from Table 2, the individual active ingredients have unsatisfactory stability on storage and stability of form.

They either become fluid at slightly elevated temperatures or cake very easily under pressure. In both cases, the result is a massive form which is not useful for users. Admixing of Ca stearate gives a very slight improvement in this behavior. However, acceptable stability of form and stability on storage is only achievable at above almost 50% of Ca stearate.

The mixtures made from the active ingredients have considerable advantages here.

Method of Preparing the Mixtures
(I) Preparation of the Additive Mixtures
 a) As Physical Mixture of Powders The stated components were placed in powder form into a mixer (Diosna V25, Dierks & Sohne) and mixed for 5 min. For testing compaction behavior by the caking test, the fractions having a grain size >2[mm] were screened out.

b) As a Mixture of Melts

Mixtures of melts made from the stated additives were prepared in a 2 l Erlenmeyer flask with hotplate/oil heating bath/contact thermometer and stirrer unit, by stirring the alkoxylated amine into the GMS melt. (Mixing of Hostastat FE 2 and Hostastat FA 14 at a temperature of from 80 to 90° C. gave a clear melt). After the mixing time of about 3 min, the melts were emptied into a steel dish and allowed to cool at room temperature. Comminution was carried out by firstly coarsely comminuting the resultant block and then cooling it with liquid nitrogen so that the resultant mass could be comminuted using a pelletizer.

c) As Sprayed Powder

Mixtures of melts were prepared as under b), and these mixtures were held at a few degrees above their hardening temperature (HT). Spraying was carried out with an air temperature of about 15[°C.], using a laboratory spray system from Prölls, Bopfingen.

What is claimed is:

1. A solid, storage-stable antistatic mixture consisting essentially of alkoxylated amines of the formula (I) and fatty acid glycerides of the formula (II)

(I)

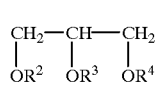

(II)

where
 n is 2 or 3
 $R^1$ is $C_8$–$C_{22}$-alkyl or -alkenyl or $C_8$–$C_{22}$-alkyl-CO— and
 $R^2$, $R^3$ and $R^4$ may be identical or different and are $C_8$–$C_{22}$-alkyl or -alkenyl and two of these radicals may be hydrogen,
 and where the mixing ratio of the compounds of formulae I and II is from 4:1 to 1:10 parts by weight.

2. The mixture as claimed in claim 1, wherein n is 2, $R^1$ is $C_{12}$–$C_{18}$-alkyl or -alkenyl or $C_{12}$–$C_{18}$-alkyl-CO— and $R^2$, $R^3$ and $R^4$ are identical or different and are hydrogen or $C_{12}$–$C_{18}$-alkyl.

3. A mixture as claimed in claim 1, wherein n is 2, $R^1$ is $C_8$–$C_{22}$-alkyl or -alkenyl, and either radical $R^2$, $R^3$, or $R^4$ is $C_8$–$C_{22}$-alkyl or -alkenyl, and the remainder of radicals $R^2$, $R^3$ or $R^4$ are hydrogen.

4. The mixture as claimed in claim 1, wherein n is 2, $R^1$ and, in each case, one of the radicals $R^2$, $R^3$ or $R^4$ are identical and are $C_{12}$–$C_{18}$-alkyl or -alkenyl, and the two other radicals $R^2$, $R^3$ or $R^4$ are hydrogen.

5. The mixture as claimed in claim 1, wherein the mixing ratio of the compounds of the formulae I and II is from 1:2 to 1:6 parts by weight.

6. The mixture as claimed in claim 1, wherein the mixing ratio of the compounds of the formulae I and II is from 1:3.5 to 1:4.5 parts by weight.

7. The mixture as claimed in claim 1, further comprising an additive selected from the group consisting of silicic acid, Cu stearate, Zn stearate, polyethylene, polyethylene wax, polypropylene, and polypropylene wax.

8. A method of using a mixture as claimed in claim 1, comprising incorporating said mixture as an antistatic additive in a plastic molding composition.

9. A plastic molding composition comprising a mixture as claimed in claim 1.

10. A process for preparing solid, antistatic mixtures of additives for plastics comprising:

mixing alkoxylated amines of formula (I) as a first component

(I)

with fatty acid glycerides of formula (II) as a second component

(II)

wherein
  n is 2 or 3
  $R^1$ is $C_8$–$C_{22}$-alkyl or -alkenyl or $C_8$–$C_{22}$-alkyl-CO— and
  $R^2$, $R^3$ and $R^4$ may be identical or different and are $C_8$–$C_{22}$-alkyl or -alkenyl and two of these radicals may be hydrogen, ps in a ratio of from 4:1 to 1:10 parts by weight, and heating the components of the formula (I) and of formula (II) until a homogeneous melt is obtained.

11. The process as claimed in claim 10, wherein the homogeneous melt of the components (I) and (II) is comminuted after cooling in a pelletizer, with extruder, in an edge-runner mixer with perforated plate, or via a flaking roll or drop belt.

12. The process as claimed in claim 10, wherein the melt is further processed in a melt spray apparatus to produce a sprayed powder.

* * * * *